United States Patent [19]

Torii et al.

[11] Patent Number: 4,779,192
[45] Date of Patent: Oct. 18, 1988

[54] VECTOR PROCESSOR WITH A SYNCHRONOUSLY CONTROLLED OPERAND FETCH CIRCUITS

[75] Inventors: Shunichi Torii, Musashino; Keiji Kojima, Kokubunji; Masahiro Hashimoto, Sagamihara, all of Japan

[73] Assignee: Hitachi, Ltd., Tokyo, Japan

[21] Appl. No.: 685,116

[22] Filed: Dec. 21, 1984

[30] Foreign Application Priority Data

Dec. 23, 1983 [JP] Japan .................. 58-242007

[51] Int. Cl.⁴ .......................................... G06F 15/347
[52] U.S. Cl. ..................................... 364/200; 364/736; 364/730
[58] Field of Search ........ 364/736, 730, 200 MS File, 364/900 MS File

[56] References Cited

U.S. PATENT DOCUMENTS

| | | | |
|---|---|---|---|
| 3,794,984 | 2/1974 | Deerfield et al. | 364/200 |
| 4,172,287 | 10/1979 | Kawabe et al. | 364/736 |
| 4,270,181 | 5/1981 | Tanakura et al. | 364/736 |
| 4,293,941 | 10/1981 | Muraoka et al. | 364/200 |
| 4,412,285 | 10/1983 | Neches et al. | 364/200 |
| 4,525,796 | 6/1985 | Omoda et al. | 364/730 |
| 4,641,275 | 2/1987 | Hatakeyama et al. | 364/900 |
| 4,685,076 | 8/1987 | Yoshida | 364/736 |

OTHER PUBLICATIONS

P. M. Kogge, *The Architecture of Pipelined Computers*, 1981, chapter 5.2.8, pp. 204–207.

*Primary Examiner*—Gareth D. Shaw
*Assistant Examiner*—Christina M. Eakman
*Attorney, Agent, or Firm*—Antonelli, Terry & Wands

[57] ABSTRACT

A vector processor for sequentially reading out elements of a plurality of vector operands and sequentially storing the results of operations to the vector operands, comprising: operand counters for indicating the element numbers for every operand; address registers for every operand; a first comparator for comparing each element of the vector; maximum number registers for storing the maximum numbers of elements of the respective operands; a second comparator for comparing the operand counter of each operand with the content of the maximum number registers of each operand with respect to each operand; and a control circuit for independently updating the operand counters and operand address registers of ech operand in response to all of or parts of the outputs of the first and second comparators.

20 Claims, 12 Drawing Sheets

FIG. 1

| | PART NAME | PART NUMBER | |
|---|---|---|---|
| #1 | A | 7 | |
| #2 | B | 1 | |
| #3 | C | 6 | |
| #4 | D | 3 | |
| #5 | E | 0 | |
| #6 | F | 9 | |
| #7 | G | 5 | |

Table 1

| | IMPLEMENTOR NAME | PART NUMBER | |
|---|---|---|---|
| #1 | T | 6 | |
| #2 | U | 0 | |
| #3 | V | 9 | |
| #4 | W | 2 | |

Table 2

| | PART NAME | PART NUMBER | IMPLEMENTOR NAME | |
|---|---|---|---|---|
| #5 | E | 0 | U | #2 |
| #3 | C | 6 | T | #1 |
| #6 | F | 9 | V | #3 |

Table 3

F I G. 7
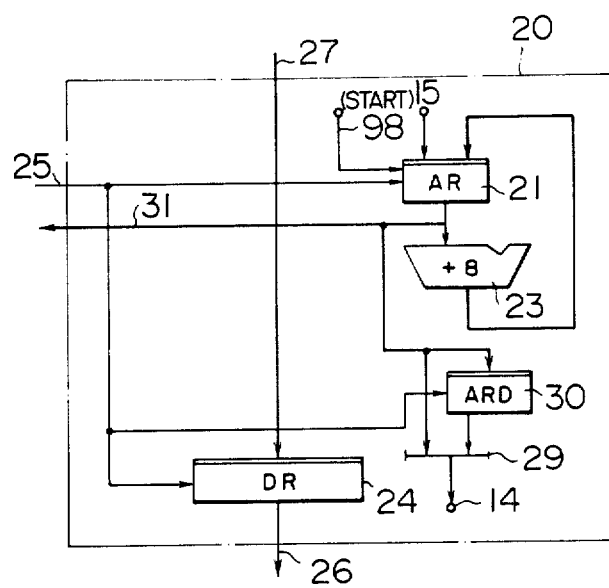
F I G. 8
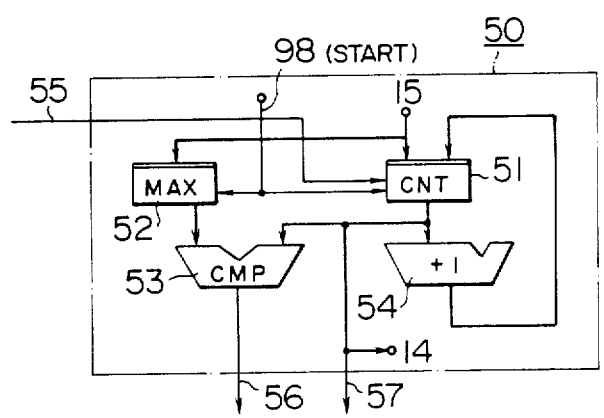

F I G. 10
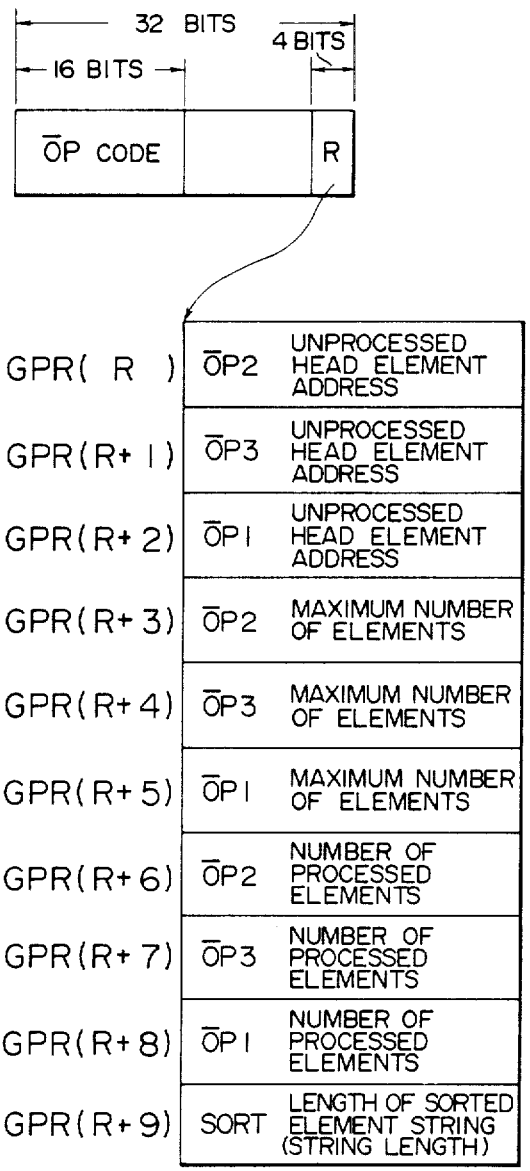

FIG. II

SEQUENCE CONTROLLER

FIG. 13

| SIGNAL LINE NUMBER | | 17 | 110 | 56a | 56b | 56c | 109 | 55a | 55b | 55c | 18 |
|---|---|---|---|---|---|---|---|---|---|---|---|
| INPUT/OUTPUT | | INPUT | | | | | | OUTPUT | | | |
| MEANING OF THE SIGNAL | | KIND OF INSTRUCTION | OP2 :OP3 | OP2CNT :OP2MAX | OP3CNT :OP3MAX | OP1CNT :OP1MAX | OP1CNT·STRNG :OP3CNT·STRNG | OP2 SELECTION | OP3 SELECTION | OP1 OUTPUT | REPORT OF COMPLETION OF INSTRUCTION |
| ITEM NO. 1 | | SORT EFFECTIVE | ≦ | < | < | < | = | – | ○ | – | ○ |
| 2 | | SORT EFFECTIVE | > | < | < | < | = | ○ | – | – | ○ |
| 3 | | SORT EFFECTIVE | × | < | < | < | < | – | ○ | – | ○ |
| 4 | | SORT EFFECTIVE | × | < | × | < | > | ○ | – | ○ | ○ |
| 5 | | SORT EFFECTIVE | × | × | ≧ | ≧ | × | – | – | – | – |
| 6 | | SORT EFFECTIVE | × | < | ≧ | < | × | ○ | ○ | – | ○ |
| 7 | | SORT EFFECTIVE | × | ≧ | < | < | × | ○ | ○ | ○ | ○ |
| 8 | | SORT EFFECTIVE | ∧ | × | × | × | × | – | – | ○ | – |
| 9 | | INEFFECTIVE | ∨ | × | < | < | × | ○ | – | ○ | ○ |
| 10 | | JOIN EFFECTIVE | < | < | < | < | × | – | ○ | ○ | ○ |
| 11 | | JOIN EFFECTIVE | = | < | < | < | × | ○ | – | – | ○ |
| 12 | | JOIN EFFECTIVE | × | ≧ | × | × | × | – | – | ○ | – |
| 13 | | JOIN EFFECTIVE | × | × | ≧ | × | × | ○ | ○ | ○ | – |
| 14 | | JOIN EFFECTIVE | × | × | × | × | × | – | – | – | – |
| 15 | | JOIN EFFECTIVE | × | × | × | ≧ | × | ○ | ○ | ○ | – |

VECTOR PROCESSOR WITH A SYNCHRONOUSLY CONTROLLED OPERAND FETCH CIRCUITS

The present invention relates to a vector processor and, more particularly, to a vector processor which is suitable for an extended vector operation.

In a conventional vector process, it is a principle that the operations for respective vector elements are executed by classifying the elements by the vector element number (i.e. elements of the same number being successively operated on). and the results are stored as vector elements of the same element number. Only exception is allowed for a case where some of the operand vectors are scalars.

It has been known that the above vector processes can be widely applied to numerical calculations, such as operations among matrices. Vector processors, typically CRAY-1 a product of Cray Research Inc., have been commercially manufactured. These vector processors have a problem that a sufficiently high operating speed cannot be obtained when the applicability of vector processing is not very high. For example, an application rate of about 90% may be required for exhibiting the full merit of vector processing. Here, the application rate or factor of the vector process represents a ratio of the execution time in the case where the operation is made using only the scalar function in the portion to which the vector processes can be applied to the execution time in the case where all calculations are operated using only the scalar function. For instance, in the case where the application factor of the vector processes is 50%, even if the operating speed is made fairly high due to the vector processes, the operating speed of the overall calculation cannot be improved by twice or more.

For example, with respect to the table coupling (JOIN) process in the relational data base, a reason why the vector processes cannot be applied by a conventional technology will be practically described hereinbelow.

In the relation data base, all data is stored in a table format. A parts table 1 shown in the upper left portion in FIG. 1 is a table in which part names and part numbers are written as columns. An implementor table 2 shown in the upper right portion in FIG. 1 is a table in which implementor names and part numbers are written as columns. By coupling these two tables using the columns of the part numbers as the coupling column, a new table 3 in which part names, part numbers and implementor names are written as columns is obtained as shown in the lower portion in FIG. 1. In this table 3, it is possible to indicate the relation between the part names and the implementor names which cannot be derived by individually retrieving the above two tables 1 and 2. Generally, in the relational data base, the process for coupling a plurality of tables may frequently occur and this makes the processing time long, so that it forms one of the main causes of the slow response time of the relational data base.

Item numbers shown in the outside of each table in FIG. 1 denote record numbers in each table.

The following merge method has been known as a method of realizing the coupling process shown in FIG. 1.

(1) To sort the parts table in accordance with the sequence of the part numbers.

(2) To sort the implementor table in accordance with the sequence of the part numbers.

(3) To perform the merge coupling of the two tables (hereinbelow, referred to as merge join).

FIG. 2 shows a main procedure in the case where the sort of (1) is executed according to a merge sort method among various kinds of sort algorithms.

(i) To make vectors V1 to V7 from the table 1 in FIG. 1. In each of these vectors, the number of elements is one and one element of the vector consists of the values of the record number and part number.

(ii) To make V8 from the V1 and V2, V9 from the V3 and V4, and V10 from the V5 and V6 by merge sort processors M1, M2 and M3. The merge sort process means that the values of the part numbers of the remaining head elements of two vectors are compared and the smaller value is fetched and outputted. When the element on one side is absent, the other element is fetched and outputted. As the results of the merge sort processes M1, M2 and M3, the output vectors V8, V9 and V10 become the vectors each of which has two elements and was sorted with regard to the part number. The V7 is outputted as it is as V11.

(iii) To make V12 from the V8 and V9, and V13 from the V10 and V11 by merge sort processes M4 and M5. The V12 has four elements and V13 has three elements and they have been sorted with respect to the part number.

(iv) Finally, to make V14 by a merge process M6. The information of all records is sorted with regard to the part number and stored in the V14.

With regard to the sort (2) of the table 2 as well, a vector (V15 in FIG. 3) in which the information of all records is sorted with respect to the part number and stored is made by a merge sort method similar to FIG. 2.

FIG. 3 shows inputs and outputs of the processes in the merge join (3) between the tables. Namely, the vectors V14 and V15 are inputted and a vector V16 in which the record numbers in the two tables having the same part number are listed as the elements is outputted. In the merge join process, a comparison is sequentially made from the heads of the two input vectors and only in the case where the values of the part numbers are the same, the former half portions of the elements of the two input vectors, i.e. the record numbers, are outputted. Since the record numbers in the tables 1 and 2 are stored in the vector V16, the table 3 in FIG. 1 can be easily made. In this way, it is necesary to execute the processes of the relational data base by combining a number of different kinds of operations.

Among the above-mentioned table coupling processes, if a conventional vector processor, e.g. S810 available from Hitachi Ltd., is used, the sort process (1) for making the vectors V1 to V7 from the table 1 and the process for making the table 3 from the vector V16 can be executed using vector instructions. However, the merge sort process and merge join process which take the longest processing time cannot be executed at all using vector instructions due to the following reasons.

The merge sort process and merge join process are respectively one kind of merge process in which vector elements $A(i)$ ($i=0, 1, \ldots$) and $B(j)$ ($j=0, 1, \ldots$) shown in a PAD diagram (Program Analysis Diagram) in FIG. 4 are inputted and vector elements $C(k)$ ($k=0, 1, \ldots$) are outputted. That is, indexes i, j and k and a stop command STOP are initialized in process step P1. Process step P2 denotes that the processes in and after process step P3 are repeatedly executed until the stop command STOP becomes 'true'. Process step P3 represents that the operation ⓔ in which the vector elements A(i) and B(j) are used as the inputs is executed. This result is set to x. Process steps P4 and P5 indicate that the vector element A(i) is fetched and a discrimination is made to see if the next vector element A(i+1) is next needed or not and if it is necessary, the index i is updated. Process steps P6 and P7 likewise denote that the index j is updated as necessary. Process steps P8 and P9 represent that a discrimination is made to see if the storage of the result x of the arithmetic operation is needed or not and if it is necessary, the result x is stored in the vector element C(k) and the index k is updated. Last process steps P10 and P11 denote that a discrimination is made to see if the elements which should be processed still remain or not and if no element remains, 'true' is set into the stop command STOP.

As mentioned before, it can be considered that both merge sort process and merge join process are respectively one kind of the merge process shown in FIG. 4. In the merge sort process, the following coordinating processes can be carried out.

(i) The operation is x:=Min(A(i), B(j)). The comparison is made with respect to four bytes of the latter half. The same shall apply in the following items (ii) and (iii).

(ii) The updating of A(i) is necessary when A(i)≦B(j).

(iii) The updating of B(j) is necessary when A(i)>B(j).

(iv) The storage into C(k) is necessary as long as the effective elements exist in A(i) and B(j).

(v) The stop command (STOP:='true') is generated when no effective element remains in both A(i) and B(j).

On the other hand, in the merge join process, the following coordinating processes can be performed.

(a) The operation is x:=(coupling of the former half of A(i) and the former half of B(j)).

(b) The updating of A(i) is necessary when A(i)≦B(j). However, the comparison is made with respect to four bytes in the latter half portion of each element. The same shall apply in the following items (c) and (d).

(c) The updating of B(j) is necessary when A(i)≧B(j).

(d) The storage into C(k) is necessary when A(i)=B(j).

(e) The stop command (STOP:='true') is generated when no effective element remains in either A(i) or B(j). Although the merge process shown in the PAD diagram (Program Analysis Diagram) in FIG. 4 is the arithmetic logic operation whereby the vectors A and B are sequentially read out and the elements are operated and then the results are stored as the vector C, it should be noted that the indexes (i, j, k) indicative of the element numbers of each vector do not uniformly increase. Practically speaking, the l-th vector element A(l) of the vector A is not always operated on with the same l-th vector element B(l) of the vector B, and the content of the vector element A(l) is not always concerned with the result of the storage of the same l-th vector element C(l) of the vector C.

On the other hand, in conventional vector processes, it is a principle that the vector elements of the same element number are operated on and the results are stored as the elements of the same number. Therefore, there is a drawback such that it is difficult to efficiently execute the merge process using only the vector instructions to execute the conventional vector processes.

On one hand, when attention is paid to only the sort process, there has been publicly known a dedicated merge sorter disclosed in the article: "Constitution of the pipeline sorter", Proceedings of Institute of Electronics and Communication Engineers of Japan, Vol. J66-D, No. 3, March, 1983. However, it has the following drawbacks in case of using such sorter for the above-mentioned table coupling process.

(a) The above sorter has an internal memory and the upper limit of the number of elements which can be sorted is determined by the capacity of the internal memory.

(b) The inputs and outputs of the sorter are constituted by assuming the data stream of which data is flowing without interruption. The sorter does not have means for designating an arbitrary vector stored in the main storage or the like as an input or output. Therefore, it is impossible to efficiently input the output vector made by other vector instructions into the sorter or to efficiently refer to the outputs of the sorter as the input vector of the other vector instructions. Namely, since the above sorter has only the single function of only the sorting process, complicated processes such as the relational data base cannot be executed by combining a plurality of functions.

It is an object of the present invention to provide an extended vector processor which can efficiently execute the extended vector operations such as the foregoing merge process in which the increase of each index of the vector and the presence/absence of the results to be stored depend upon each result of the arithmetic logic operation.

A second object is to provide a function to perform the sort operation in which the number of elements is not limited by designating by an instruction word.

A third object is to provide a function to perform the sort operation by a vector instruction in which the storing areas for the input and output vectors are designated by a program.

A fourth object is to improve the application factor of the vector operations.

A fifth object is to provide a general processor which can designate complicated processes such as the relational data base as the vector operands in the main storage by combining a sort instruction, join instruction, vector instruction, etc. and can execute those processes at a high operating speed.

To accomplish these objects, according to the present invention, an address generating circuit of the operand and a circuit for counting the number of elements executed are provided for every operand, and a circuit for independently controlling each address generating circuit and counting circuit for every operand in accordance with the result of the arithmetic operation is added, thereby enabling a high operating speed similar to a conventional vector processor to be realized.

The present invention will be apparent from the following detailed description in conjunction with the accompanying drawings, in which:

FIG. 1 is a diagram showing the coupling process operation of the relational data base as an example to which the present invention is applied;

FIG. 7 is an arrangement diagram of an operand storage controller in FIG. 6;

FIG. 8 is an arrangement diagram of an operand counting circuit in FIG. 6;

FIG. 10 is a diagram showing instruction formats of extended vector instructions;

FIG. 13 is a tuuth table of a discrimination controller in FIG. 6.

An embodiment of the present invention will now be described in detail hereinbelow with reference to FIG. 5 and subsequent drawings. In this embodiment, it is assumed that all registers and flip flops operate synchronously with clocks (CLK).

Figure 5:
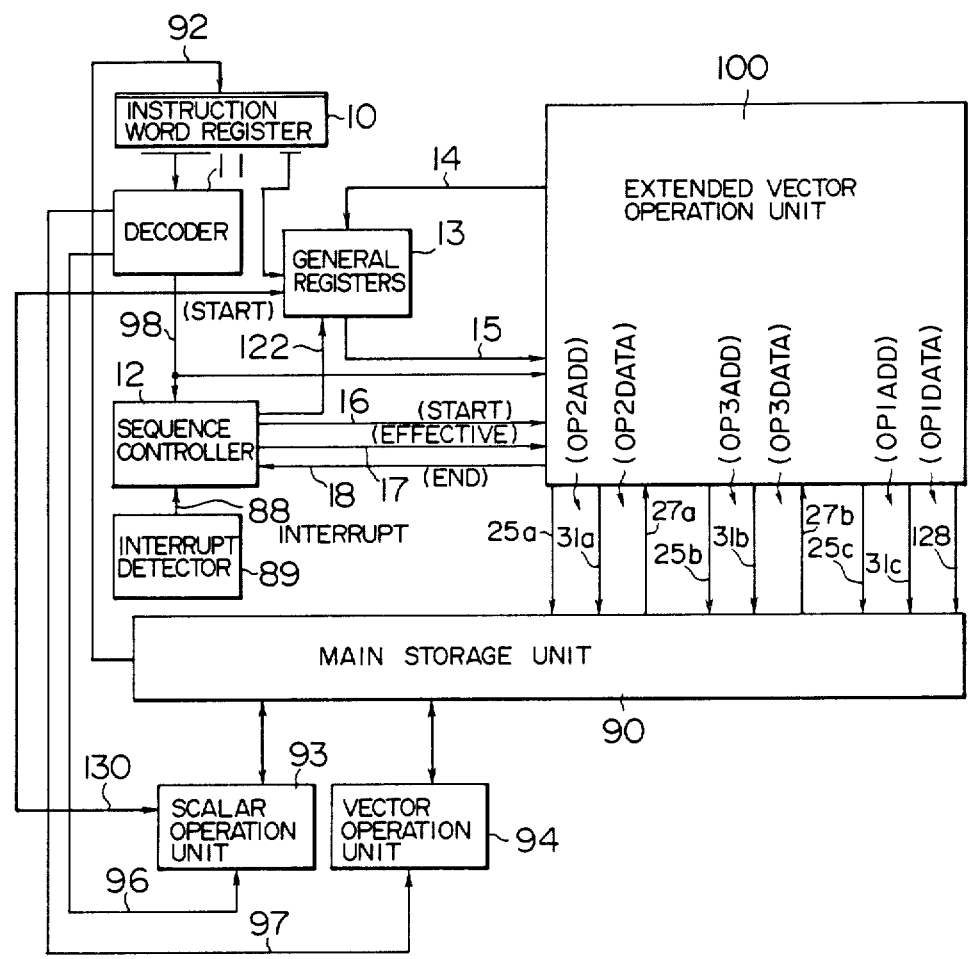
FIG. 5 is a diagram showing an overall arrangement of an extended vector processor.
Figure 6:
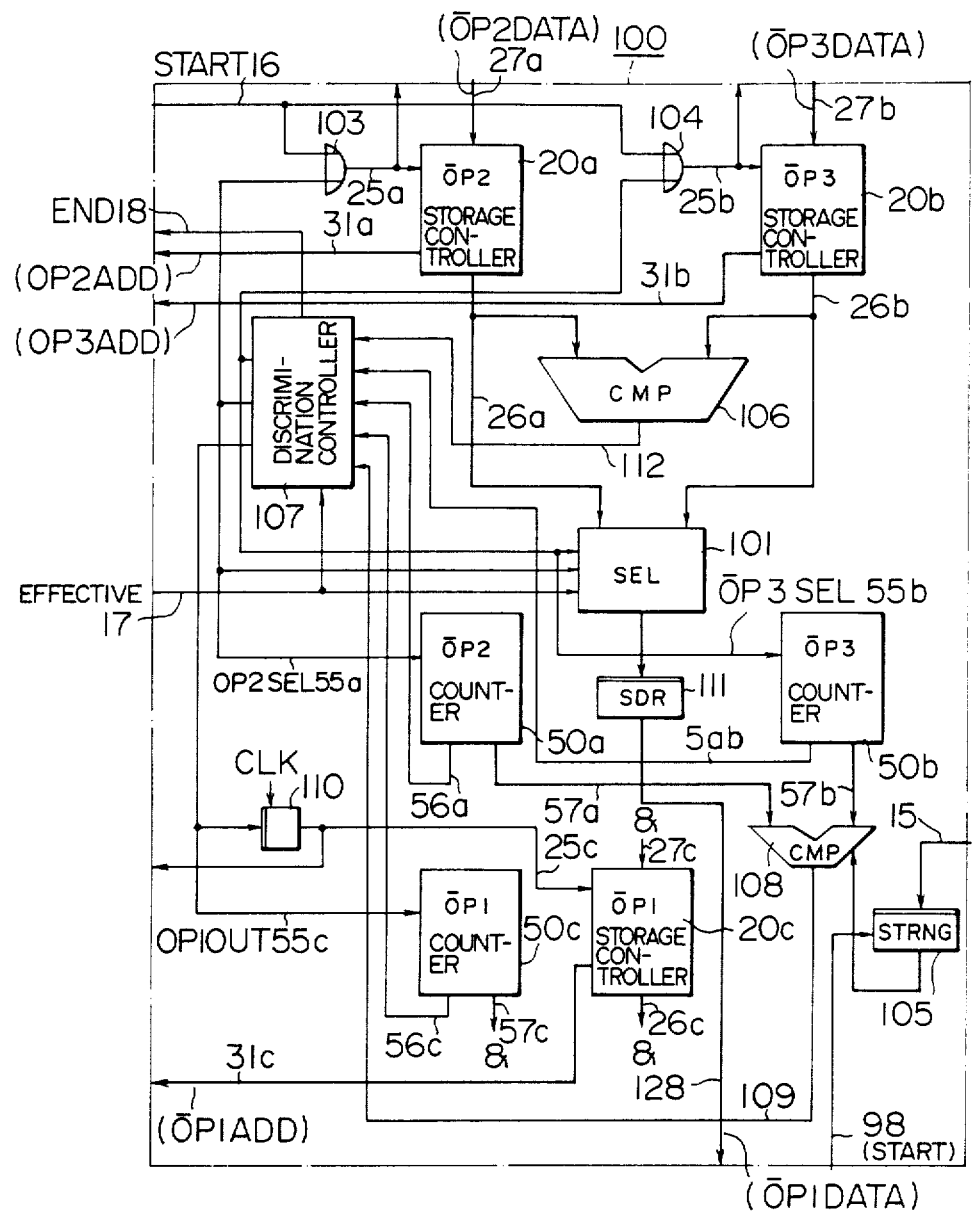
FIG. 6 is an arrangement diagram of an extended vector operation unit in FIG. 5.
Figure 11:
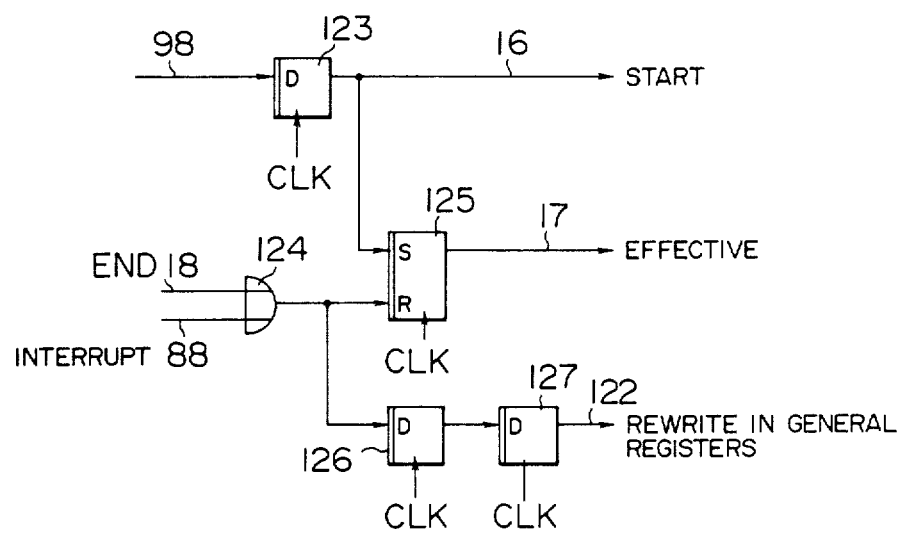
FIG. 11 is an arrangement diagram of a sequence controller in FIG. 5.

FIG. 5 is a diagram showing an overall arrangement of a vector processor to which the present invention is applied, in which a reference numeral 90 denotes a main storage unit for storing instructions and vectors; 10 is an instruction word register for holding instruction words which are executed by this vector processor; 13 denotes general registers in which the referring/updating can be performed by instruction words from a program; 100 is an extended vector operation unit which can execute the foregoing merge process (its detail is shown in FIG. 6); 94 is a vector operation unit which can execute conventional vector instructions; 93 is a scalar operation unit which can execute scalar instructions; 11 is a decoder for interpreting the kinds of instructions; 12 is a sequence controller for controlling start/stop of extended vector operations (its detail is shown in FIG. 11); and 89 is an interrupt detecting circuit for detecting interrupt conditions to the extended vector operations. The indexing and the updating of the general registers 13 can be also executed from the scalar operation unit 93 through a data line 130.

FIG. 6 shows a detailed embodiment of the extended vector operation unit 100, in which an OP2 storage controller 20a, an OP3 storage controller 20b and an OP1 storage controller 20c for making each vector element address in the main storage unit 90 have the same circuit arrangement and the practical circuit is shown in FIG. 7. An OP2 counting circuit 50a, an OP3 counting circuit 50b and an OP1 counting circuit 50c for respectively counting the number of vector elements executed have the same circuit arrangement and the practical circuit is shown in FIG. 8.

Numerals 106 and 108 denote magnitude comparators; 110 is a flip flop (FF) of one bit; 105 a register (STRNG) for storing a sorted string length (explained later); 111 a storage register (SDR) for holding the data stored in the main storage unit 90; 107 a discrimination controller consisting of an ROM and the like for discriminating an increase and an end of the element number of each operand vector (its detail is shown in FIG. 13); and 103 and 104 are OR gates.

FIG. 7 is an arrangement diagram showing a detailed embodiment of the operand storage controller 20 (20a, 20b or 20c) in FIG. 6. A numeral 21 denotes an address register (AR) for storing a vector element address of an operand and the content of this register 21 is increased by +8 whenever one element is advanced; 23 is an adder of +8; 24 a readout data register (DR) from the main storage unit 90; 29 a selecting circuit; and 30 a register (ARD) for storing a vector element address which is one element before from the address register 21. The main storage unit completes the readout and writing operations in one cycle.

FIG. 8 is a diagram showing a detailed embodiment of the operand counter circuit 50 (50a, 50b or 50c) in FIG. 6. A numeral 51 denotes a counter (CNT) indicating the number of each vector element which is being executed at the moment; 52 a register (MAX) for storing the total number of elements of each vector; 53 a magnitude comparator; and 54 an adder of +1.

A procedure will now be described hereinbelow a procedure where the foregoing merge sort processes and merge join processes are executed by the above-mentioned vector processor in response to new merge sort instructions and new merge join instructions (their instruction formats will be explained later), respectively.

Figure 2:
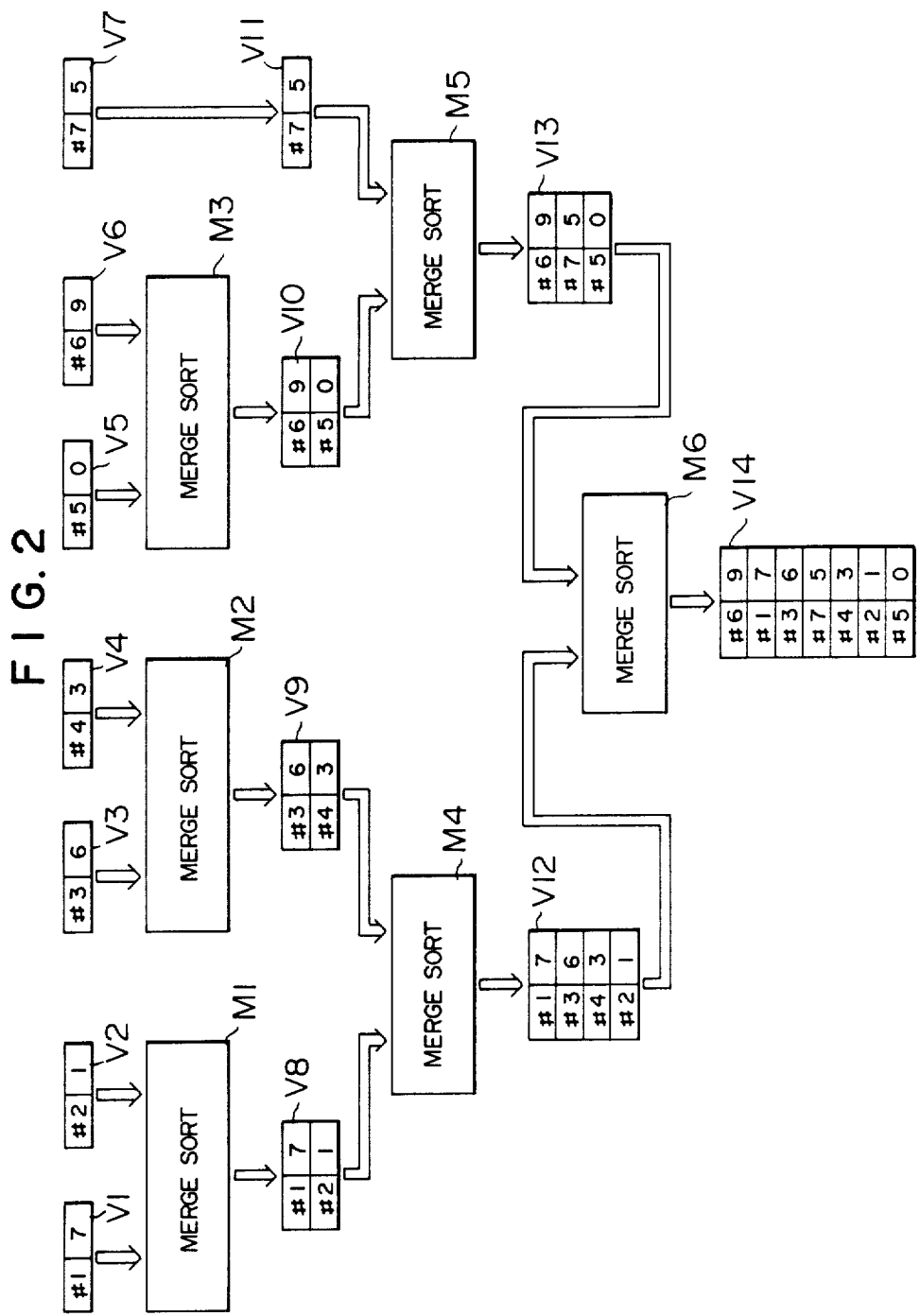
FIG. 2 is a diagram showing the operation for the merge sort process.
Figure 9:
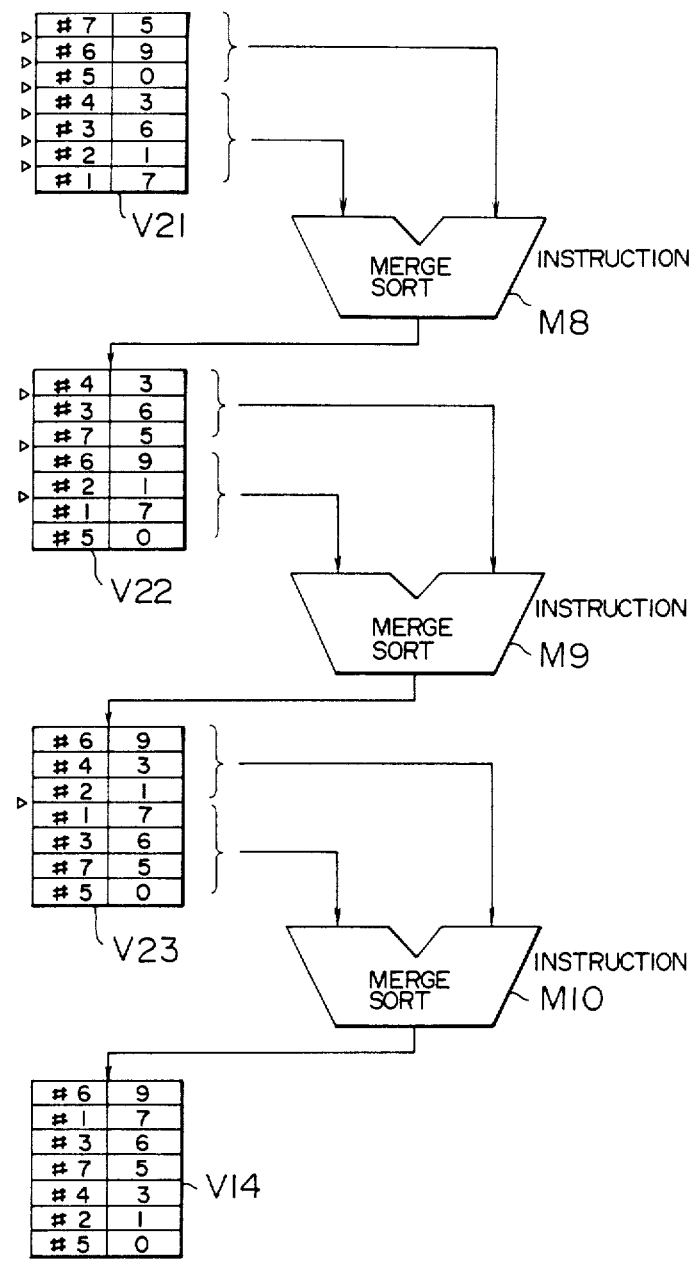
FIG. 9 is a diagram showing the operations for a merge sort instruction.

First, the sort merge process will be explained. A method of dividing the vector is improved in order to solve such drawback that the vector length is short as encountered in the foregoing merge sort method in FIG. 2. FIG. 9 shows a procedure where the completely sorted vector V14 is produced from a vector V21 by three merge sort instructions (M8, M9, M10). An arrangement of each vector element is the same as that in FIG. 2 and has the values of the record numbers in the former half four bytes and of the part numbers in latter half four bytes. Although the vector is first divided into seven vectors V1 to V7 in FIG. 2, the vector V21 arranged continuously in the main storage is first produced in FIG. 9. When the merge sort instruction M8 is executed using the former half (four elements) of the vector V21 as the second operand vector and using the latter half (three elements) as the third operand vector, a partial sort vector V22 is outputted wherein every two continuous elements are sorted. Hereinafter, a group of the vector elements, of which the sort sequence or order is established, is called a string, while the number of elements in the group is called a string length. The vector V21 can be also regarded as the partial sort vector having the string length of 1. Information of the string length of 1 is also instructed in the merge sort instruction M8 although it is not clearly shown in the diagram. A single execution of the merge sort instruction M8 allows the sort between the every two elements to be attained in the same manner as in the case where the merge sort processes M1, M2 and M3 in FIG. 2 are continuously executed. The merge sort instruction M9, in which the string length of 2 is instructed inputs a partial sort vector V22 having the string length of 2 (inputs the former half four elements as the second operand and the latter half three elements as the third operand) and outputs a partial sort vector V23 having the string length of 4. Similarly, the merge sort instruction M10, in which the string length of 4 is instructed, inputs a vector V23 and outputs the partial sort vector having the string length of 8, i.e., the completely sorted vector V14.

In FIG. 9, a mark ▷ written at the left end portion of each vector indicates a delimiter between the strings, namely, a delimiter between the elements which have the relation such that the sort sequence is not guaranteed.

A procedure to sort the vector generally consisting of N elements by the merge sort instructions will then be explained. In the merge sort instruction at the first stage, the string length of 1 is designated, the former portion of the input vector is designated as the OP2 vector, and the remaining latter portion is designated as the OP3 vector; thus, the partial sort vector having the string length of 2 is obtained as the output vector of OP1. In a similar manner as above, in the merge sort instruction at the L-th stage, the partial sort vector having the string length of $2^L$ is derived as the output by designating the string length of $2^{L-1}$. By repeatedly performing such processes with respect to $L=1, 2, 3, \ldots$ until the relation of $2^L \geq N$ is satisfied, N completely sorted vectors are obtained.

The methods of dividing the input vectors into the former half portion and the latter half portion differ at every stage. At the L-th stage, the input vector has to be divided so as to satisfy all of the following three conditions.

(1) A dividing point between the former half and latter half portions is located at the boundary portion of the strings. Namely, the number of vector elements in the former half portion is a multiple of $2^{L-1}$.

(2) The numbers of strings in the former half and latter half portions are the same or differ by only one.

(3) In the case where there is a difference in number of strings and at the same time N is not a multiplie of $2^{L-1}$, the number of strings in the former half portion is smaller.

With the above dividing conditions satisfied, the output vector can be constituted by the strings, all of which have the same length of $\pm 2^L$ excluding the last string. This is because, excluding the case where the last string is produced, the two sets of corresponding strings each consisting of $2^{L-1}$ strings are inputted by the OP2 and OP3 and the $2^L$ strings are outputted as the OP1.

Assuming that $N = 2 \times n \times 2^{L-1} + m$ (where, n and m are integers and $0 < m < 2L$), the number $N_{op2}$ of vector elements in the former half portion will be determined by the following equations.

$N_{op2} = n \times 2^{L-1}$ when $m=0$.

(n strings exist in both former half and latter half portions.)

$N_{op2} = n \times 2^{L-1}$ when $1 \leq m \leq 2^{L-1} - 1$.

(n strings exist in the former half portion and n+1 strings exist in the latter half portion.)

When $m = 2^{L-1}$, $N_{op} = n \times 2^{L-1}$ (n strings exist in the former half portion and n+1 strings exist in the latter half portion.)

or $N_{op} = (n+1) \times 2^{L-1}$ (n+1 strings exist in the former half portion and n strings exist in the latter half portion.)

$N_{op2} = (n+1) \times 2^{L-1}$ when $2^{L-1} + 1 < m < 2^L - 1$.

(n+1 strings exist in both former half and latter half portions.)

For instance, $$N_{op2} = \left\lfloor \frac{N + 2^{L-1}}{2^L} \right\rfloor \times 2^{L-1}$$

satisfies the above equations. In this expression, $\lfloor \ \rfloor$ denotes an omission of the figures below decimals.

Figure 3:
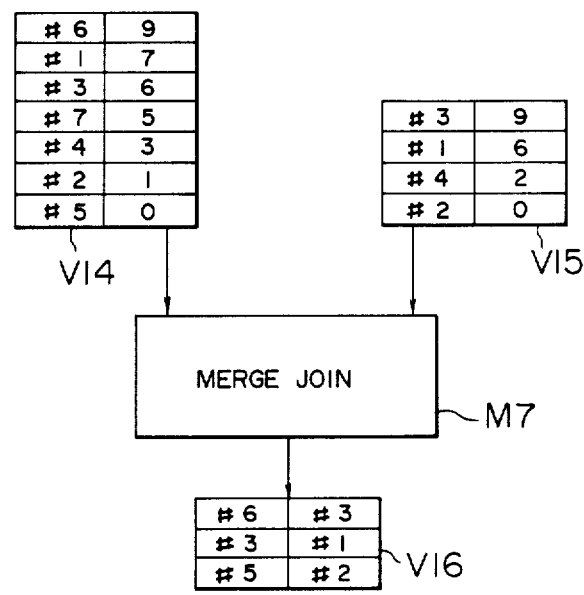
FIG. 3 is a diagram showing the operation for the merge join process.

Similar to the merge join processes shown in FIG. 3, in the merge join instruction, the vector V14 produced from the table 1 and the vector V15 produced from the table 2 are inputted and the vector V16 is produced.

The detailed specifications of and the operations for the above-mentioned two instructions will then be explained hereinbelow with respect to an embodiment with reference to the drawings.

Figure 4:
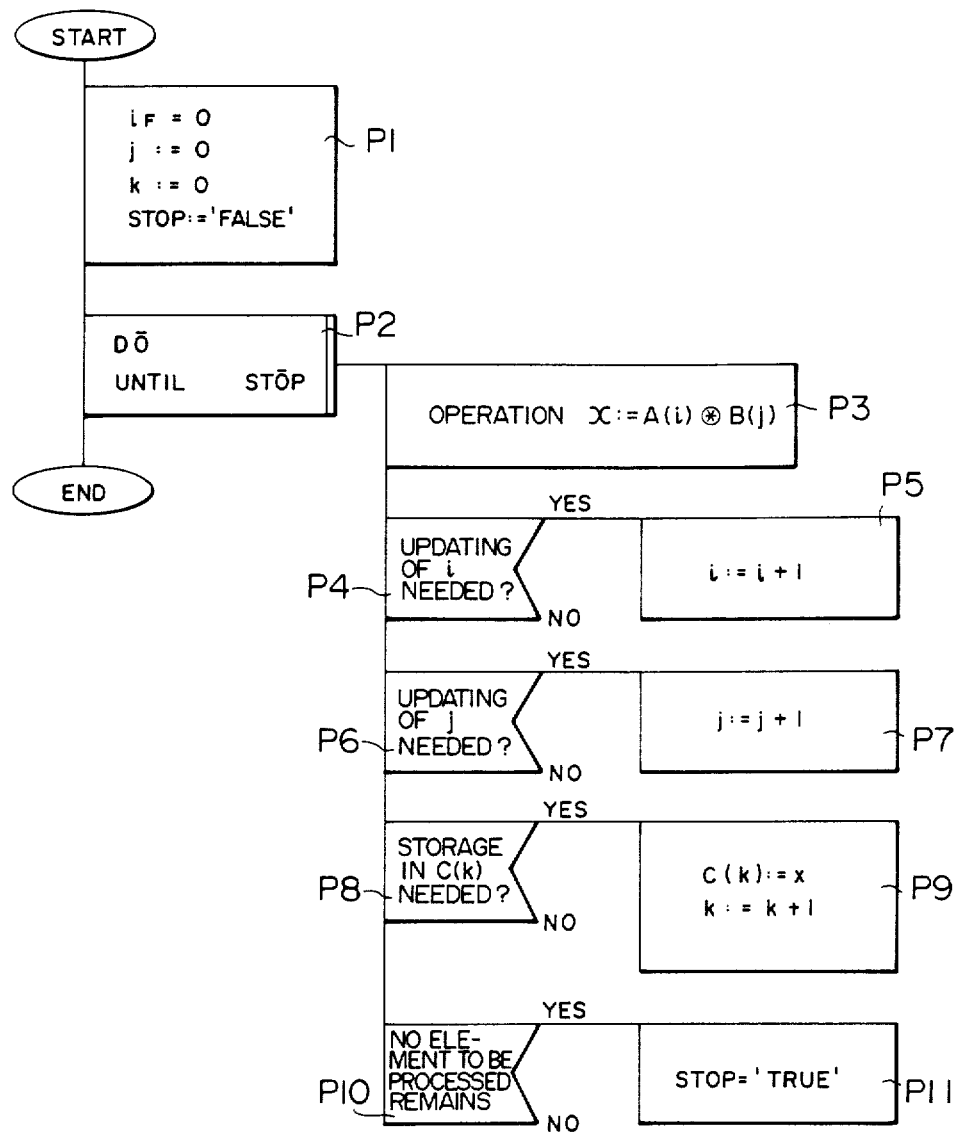
FIG. 4 is a flow chart for the extended vector operation.

FIG. 10 shows instruction formats of the extended vector operation instructions. The merge sort instruction and merge join instruction are designated by the former half 16 bits (OP code section) of the four-byte instruction. The head numbers of the register numbers used among the sixteen general registers GPR are designated by the last four bits (R section). In these instruction fomats, even if the operation is stopped due to interruption at the halfway point of execution of the instruction, the operation can be restarted. The unprocessed head element addresses (head element addresses upon starting) of the second, third and first operands (OP2, OP3, OP1) are stored in the general registers R, R+1 and R+2. The maximum number of elements of each of those operands is set into each of the general registers R+3, R+4, and R+5. The number of processed elements of each of those operands (0 upon starting) is set into each of the general registers R+6, R+7 and R+8. These numbers are set when the instructions are started. The sorted string length (number of elements) in the input vectors, which is used only in the merge sort instruction, is set into the general register R+9. The three vectors A(i), B(j) and C(k) in FIG. 4 are associated with the OP2, OP3 and OP1, respectively. In addition, the general registers can be updated by scalar instructions.

In order to constitute the instructions as the formats such that an interruption is possible even during the execution of the instruction, when the execution of the instructions are interrupted, the updated values of the unprocessed head addresses and of the number of processed elements of each operand are stored in the general registers.

Like the vectors V22, V23 and V14 in which each element consists of eight bytes as shown in FIG. 9, the second and third operands OP2 and OP3 and the first operand OP1 in the merge sort instruction store the data values in which the former half four bytes of each element are referred to as the record number and the latter half four bytes are referred to as the sort or join. Like the vector V16 in which each element consists of eight bytes as shown in FIG. 3, the first operand OP1 in the merge join instruction stores the data values in which the former half four bytes of each element indicate the record number inputted from the second operand OP2 and the latter half four bytes represent the record number inputted from the third operand OP3.

The operation will then be described in detail with reference to FIG. 5 and subsequent drawings. First, an instruction word is stored into the instruction word register 10 from the main storage unit 90 through a data line 92. The operation decoder 11 inputs the higher significant 16 bits in the instruction word register 10 and discriminates the kind of instruction. When it is a scalar instruction, the scalar operation unit 93 is actuated through a control line 96. In case of a vector instruction, the vector operation unit 94 is actuated through a control line 97.

In case of an extended vector instruction, the sequence controller 12 is actuated through a control line 98. At the same time, the contents of the ten registers among the general registers 13 which are designated by the lower significant four bits in the instruction word register 10 synchronously with the instruction on the control line 98 are transferred to the extended vector operation unit 100 through a data line 15. The sequence controller 12 transfers a START signal in one cycle to the extended vector unit 100 through a control line 16. In the next cycle, the sequence controller 12 transmits a "merge sort instruction is effective" or "merge join instruction is effective" signal through a control line 17 and continues the transmission of these effective signals until an END signal indicative of the completion of operation reaches through a control line 18 or an interruption signal reaches from the interrupt detecting circuit 89 through a control line 88.

When the extended vector operations have been completely performed or interrupted, the contents of the unprocessed head element addresses (three sets) and of the number of processed elements (three sets) of each operand are rewritten through a data line 14 into the (six) registers which are designated by the lower significant four bits in the instruction word register 10 synchronously with an instruction on a control line 122.

FIG. 11 shows a detailed embodiment of the sequence controller 12 in FIG. 5. D type flip flops 123, 126 and 127 hold the contents of the input signals for the interval of one cycle synchronously with the clocks CLK. An S/R type flip flop 125 operates synchronously with the clock and holds the input form an S pin until a reset signal is inputted from an R pin.

As described above, when the merge sort or merge join start signal in one cycle is inputted from the signal line 98, the readout from the general registers 13 and the initialization (mentioned later) of each register in the extended vector operation unit 100 are instructed. In the next cycle, the flip flop 123 becomes "1", thereby allowing the START signal of one cycle pulse to be transferred to the extended vector operation unit 100 through the signal line 16. In the next cycle, the flip flop 125 is set, so that the merge sort instruction effective signal or merge join instruction effective signal is transferred to the extended vector operation unit 100 through the signal line 17. The above operations are executed at the start of execution of the instructions.

When the instruction completion signal (END signal) of one cycle pulse is transferred through the signal line 18 or when the interrupt request signal of one cycle pulse is transferred through the signal line 88, the flip flop 125 is reset through an OR gate 124, so that the merge sort instruction effective signal or merge join effective instruction is reset. In the next cycle, a rewrite request signal for the unprocessed head element addresses and of the number of processed elements of each operand is instructed to the general registers 13 by the flip flops 126 and 127 through the signal line 122. The above operations are carried out at the end of execution of the instructions.

The extended vector operation unit 100 in FIG. 6 constitutes the pipeline having the length of the following three cycles in which the pitch corresponds to one cycle.

(1) The readout from the main storage unit of the second and third operands OP2 and OP3. (Address registers 21a and 21b are the typical resources.)

(2) The production of the data which is stored in the storage register (SDR) 111 with regard to the results of the comparison between the operands, comparison between the counters and the selection thereof. (The register (DR) 24 and counter (CNT) 51 are the typical resources.)

(3) The writing of the first operand OP1 into the main storage unit. (The register (SDR) 111 is the typical resource.)

At the stage of (1), there exists the case where it is inhibited to advance to the next element due to the results of the selections in the stage (2) (namely, the case where the updating of the addresses/counters of the operands was not instructed). Therefore, it is adopted a method whereby the registers (AR, ARD, CNT, DR) 21, 30, 51, and 24 at the stages (1) and (2) are certainly updated synchronously with an OP2SEL signal 55a or an OP3SEL signal 55b. When the above updating instruction is not generated, the stages (1) and (2) are simultaneously frozen for every second operand OP2 or third operand OP3, thereby preventing collision of the pipeline. With respect to the stage (3), it is assumed that there is no cause of choking of the pipeline at the subsequent stage (namely, that the main storage unit always accepts the writing); therefore, the register (SDR) 111 may be updated in every cycle.

Each register is first initialized. The unprocessed head element addresses of the respective operands (OP2, OP3, OP1) which were read out from the general registers 13 through the data line 15 are initialized into address registers (AR) 21a, 21b and 21c (FIG. 7) in the respective operand storage controllers 20a to 20c, respectively.

The values of the maximum number of elements of the respective operands (OP2, OP3, OP1) which were likewise read out from the general registers 13 through the data line 15 are stored in maximum number registers (MAX) 52a, 52b and 52c (FIG. 8) in the respective operand counter circuits 50, respectively.

The values of the numbers of processed elements of the respective operands (OP2, OP3, OP1) which were similarly read out from the general registers 13 through the data line 15 are intialized into counters (CNT) 51a, 51b and 51c in the respective operand counter circuits 50, respectively.

The values of the numbers of processed elements of the respective operands (OP2, OP3, OP1) which were similarly read out from the genera registers 13 through the data line 15 are intialized into the counters (CNT) 51a, 51b and 51c in the respective operand counter circuits 50, respectively.

The length of sorted element string (string length) which was read out likewise from the general registers 13 through the data line 15 is stored in the string length register (STRNG) 105 (FIG. 6).

The above initialization and storage are executed by the instruction on the signal line 98 in FIG. 11 prior to the START signal.

Although not shown clearly, the operand storage controller 20 in FIG. 7 can instruct the operation in either readout or writing mode from the outsde.

When the operand storage controller 20 is used as the OP2 or OP3 storage controller 20a or 20b, it is fixed into the readout mode and when it is used as the OP1 storage controller 20c, it is fixed into the writing mode.

The operation in the readout mode will be first explained. In the readout mode, in the cycle when a request signal line 25 is "1", the output of the address register 21 is sent to the main storage unit 90 through an address line 31 (OP2ADD or OP3ADD), the corresponding data is read out from the main storage unit, then the result is stored in the data register (DR) 24 through a data line 27 (OP2DATA or OP3DATA) at the start of the next cycle. When the next cycle starts, simultaneously, the output of the address register (AR) 21 is stored in the address register delay (ARD) 30, and the value of which (+8) was added to the output of the address register 21 by the (+8) adder 23 is stored in the address register 21. In the readout mode, the selecting circuit 29 always sends the content of the address register delay 30 onto the data line 14. In the cycle when the request signal line 25 is "0", the readout from the main storage unit and the updating of the registers are not executed. In FIG. 6, a sign & indicates a data line which is not used.

The operation in the writing mode will then be described. In the cycle when the request signal line 25 is "1", the content of the register (SDR) 111 transmitted through a data line 128 (OP1DATA) in FIG. 6 is written as the write data into the main storage unit 90 (FIG. 5) using the content of the address register 21 transmitted through the address line 31 (OP1ADD) as the address. At the start of the next cycle, the address register 21 is updated so as to become the value of which (+8) was added to the output of the address register 21 by the adder 23. In the writing mode, the selecting circuit 29 always transmits the output of the address register 21 onto the data line 14. The address register delay 30 and data register 24 are not used in the writing mode.

In the operand counter circuit 50 of FIG. 8, at the start of the next cycle when a request signal line 55 is "1", the content of the counter (CNT) 51 is updated by only +1 using the (+1) adder 54. The content of the counter 51 is transferred to the outside through data lines 14 and 57. The comparator 53 compares the magnitudes of the contents of the counter 51 and of the maximum number register 52 and outputs the result of comparison onto a control line 56.

The remaining component elements in FIG. 6 will now be simply described hereinbelow. Numerals 103 and 104 are the two-input OR gates. The comparator 106 compares the magnitudes of the latter half four bytes on data lines 26a and 26b and outputs the result of comparison onto a control line 112. In the case where the merge sort instruction is designated through the control line 17, a selection and operation circuit 101 outputs the content of eight bytes on the data line 26a or 26b in response to a second operand selecting signal OP2SEL and a third operand selecting signal OP3SEL transmitted through the control lines 55a and 55b. In the case where the merge join instruction is designated, the selection and operation circuit 101 outputs the eight bytes of which the respective former half four bytes on the data lines 26a and 26b were integrated (the former half four bytes are integrated from the 26a and the latter half four bytes are integrated from the 26b). The storage register (SDR) 111 is the three-byte register and stores the output of the selection & opration circuit 101 at the start of each cycle. The one-bit register 110 stores an OP1 storage signal OP1OUT at the start of each cycle. The output of the register 110 is the signal of which the signal OP1OUT was delayed by one cycle. The comparator 108 compares the magnitudes of the quotients (the figures below decimals are omitted) of the content of the counter (CNT) 51a of the second operand OP2 as a dividend and of the content of the counter (CNT) 51b of the third operand OP3 as a dividend by the content of the register (STRNG) 105 as a divisor, respectively. The result of comparison is outputted onto a control line 109. This comparison is made to see if both of the operands OP2 and OP3 exist in the respective corresponding strings or either one of them advances to the next string. Since the content of the register (STRNG) 105 is certainly $2^L$ (L is a stage number of the sort), the division may be also substituted with the right shift of $(L-1)$ bits. Instead of the division, by comparing the magnitudes of the values of which the lower significant $(L-1)$ bits were cleared, the same result of comparison is also obtained.

Figure 12:
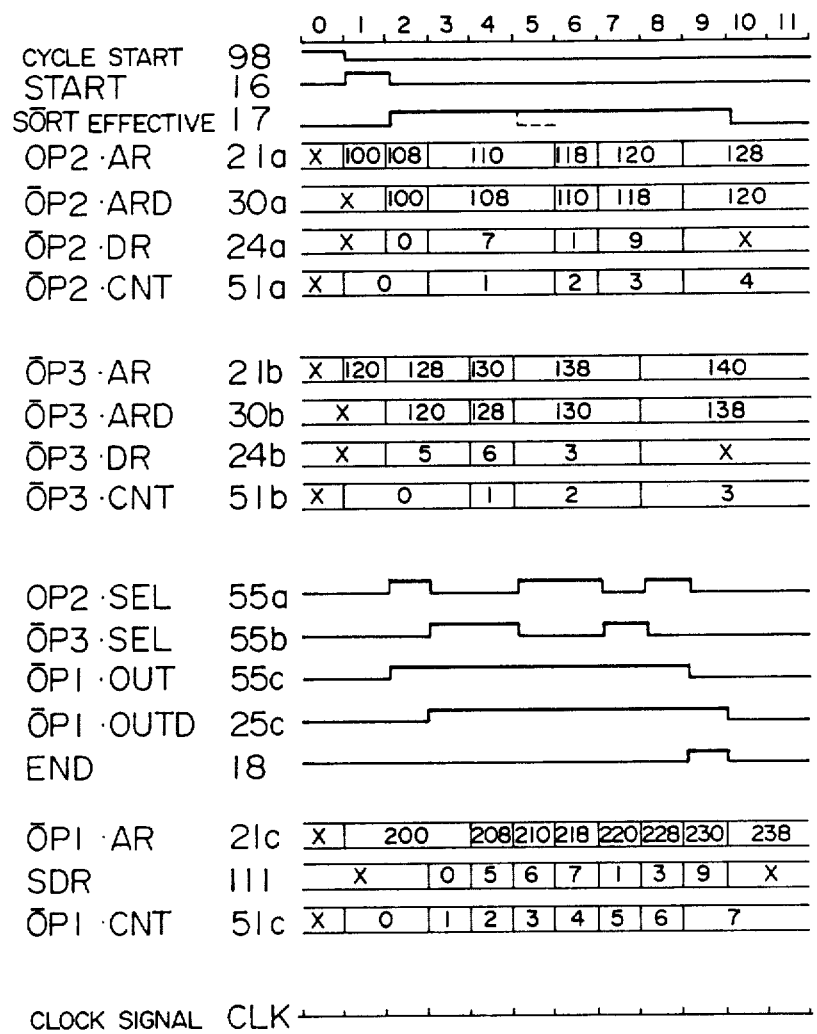
FIG. 12 is a time chart for the operation of a merge sort instruction.

The continuous operation of the extended vector operation unit 100 of FIG. 6 will then be described with reference to a time chart in FIG. 12. In this embodiment, the unit operates synchronously with the clock signal of one-cycle pitch.

When the merge sort instruction is stored in the instruction word register 10 in FIG. 5, as described before, the contents of the general registers are first initialized in the respective registers (OP2AR-21a, OP3AR-21b, OP1AR-21c, OP2MAX-52a, OP3MAX-52b, OP1MAX-52c, OP2CNT-51a, OP3CNT-51b OP1CNT-51c, and STRNG-105) shown in FIG. 6 and subsequent drawings synchronously with the instructions on the control signal line 98.

This time chart shows the process of execution of the merge sort instruction at the second time in FIG. 9. It is assumed that the input vector starts from the $100_{16}$ address in the hexadecimal number and the output vector starts from the $200_{16}$ address. The length of each element is eight bytes. This instruction is the instruction (called an interruptible instruction) in which the interruption and restart are possible when a cause of interruption occurs at the halfway point of the execution. However, in this time chart, the case where such interruption and restart are not performed is shown.

The respective registers have to be initialized into the following values due to the above assumption. These values are all set into the general registers by the scalar instructions and are transferred due to the above initialization.

OP2AR-21a = $100_{16}$
OP3AR-21b = $120_{16}$
OP1AR-21c = $200_{16}$
OP2MAX-52a = 4
OP3MAX-52b = 3
OP1MAX-52c = 7
OP2CNT-51a = 0
OP3CNT-51b = 0
OP1CNT-51c = 0
STRNG-105 = 2

Subsequent to the initialization of each register, the sequence controller 12 in FIG. 5 sends the START signal of the one-cycle pulse to the extended vector operation unit 100 in FIG. 6 through the signal line 16. For convenience of explanation, the cycles when the START signal was generated are sequentially named as the first cycle, second cycle, and the like.

Due to the functions of the OR circuits 103 and 104, signal lines 25a and 25b become "1" and the contents of the eight bytes from the 100 address and of the eight bytes from the 120 address are read out from the main storage unit synchronously with the START signal at the start of the second cycle. These contents are stored in the registers (DR) 24a and 24b. Then, address registers (AR) 21a and 21b and address register delays (ARD) 30a and 30b are updated. The START signal is needed for the first forced updating of these registers AR, ARD and DR in the second cycle.

From the second cycle, the sequence controller 12 in FIG. 5 transmits the sort instruction effective signal onto the signal line 17. The comparator 106 compares the output value (this value is "0" from FIG. 9) of the latter half four bytes in the readout register 24a with the output value (this value is "5" from FIG. 9) of the latter half four bytes in the readout register 24b and sends the result (OP2 < OP3) to the descrimination controller 107.

The discrimination controller 107 is the combinational circuit in accordance with the truth table shown in FIG. 13. X denotes a don't care condition. The input conditions in the second cycle will now be considered. The sort instruction effective signal is inputted from the signal line 17. The signal (OP2 < OP3) is inputted from the signal line 112. The signal (OP2CNT < OP2MAX) is inputted from a signal line 56a. The signal (OP3CNT < OP3MAX) is inputted from a signal line 56b. The signal (OP1CNT < OP1MAX) is inputted from a signal line 56c. The $$\text{signal}\left(\left\lfloor\frac{OP2CNT}{STRNG}\right\rfloor = \left\lfloor\frac{OP3CNT}{STRNG}\right\rfloor\right)$$

is inputted from the signal line 109. Therefore, the input condition in the item number 1 in FIG. 13 is satisfied. $\lfloor\ \rfloor$ denotes on omission of the figures below decimals.

In the item number 1 in FIG. 13, it is instructed that the OP2SEL signal on a signal line 55a and the OP1OUT signal on a signal line 55c are set to "1" as the outputs. The selection and operation circuit 101 transmits the eight bytes of the content on the data line 26a to the storage register (SDR) 111 when the OP2SEL signal is inputted by the sort instruction.

At the start of the third cycle, the OP2SEL signal is "1". Thus, respective registers 21a, 30a and 24a in the OP2 storage controller 20a and the counter OP2CNT 51a in the OP2 counting circuit 50a are updated. Since the OP1OUT signal is also "1", the content of the counter OP1CNT 51c in the OP1 counting circuit 50c is updated. Due to the function of the delay flip flop 110, the writing in the buffer of the OP1 (the writing of "#5, 0") is executed in the third cycle and the updating of the register OP1AR 21c in the OP1 storage controller 20c is executed at the start of the fourth cycle.

In a similar manner as above, the input condition of the item number 2 in FIG. 13 is satisfied from the comparison between "7" and "5" in the third cycle. The input condition of the item number 2 in FIG. 13 is satisfied from the comparison between "7" and "6" in the fourth cycle.

The condition of $$\left\lfloor\frac{OP2CNT}{STRNG}\right\rfloor < \left\lfloor\frac{OP3CNT}{STRNG}\right\rfloor$$

is satisfied in the fifth cycle and the input condition of the item number 3 in FIG. 13 is satisfied, and the content on the signal line 112 is ignored. That is, this means that although the elements of the next new string are stored in a register OP3DR 24b on the side of the third operand OP3, the elements of the old string are still stored in a register OP2DR 24c on the side of the second operand OP2. Therefore, it is necessary to select the side of the second operand OP2 irrespective of the output of the comparator 106. In the input conditions in FIG. 13, X indicates the don't care condition. In a similar manner as above, the item number 1 in FIG. 13 is satisfied in the sixth cycle; the item number 2 is satisfied in the seventh cycle; and the item number 6 is satisfied in the eighth cycle.

The item numbers 5 and 8 are satisfied in the ninth cycle and the instruction completion signal (END signal) on the signal line 18 becomes "1". When the END signal becomes "1", the sequence controller 12 in FIG. 5 makes the sort instruction effective signal ineffective from the tenth cycle. Next in the eleventh cycle, in accordance with the instruction on the signal line 122 in FIG. 11, the contents of the second operand address register delay (OP2ARD) 30a, third operand address register delay (OP3ARD) 30b, first operand address register (OP1AR) 21c, second operand counter (OP2CNT) 51a, third operand counter (OP3CNT) 51b, and first operand counter (OP1CNT) 51c are respectively rewritten into the general registers 13 through the data line 14. At this time, the contents of the registers are $128_{16}$, $140_{16}$, $238_{16}$, 4, 3, and 7, respectively.

In the foregoing description, the case where no interruption occurs on at the halfway point of execution has been shown. Next, the case where the interrupt detecting circuit 89 reports a request for interruption through the signal line 88 will be described. Assuming that the interruption request is reported in the fourth cycle, the sequence controller 12 makes the sort instruction effective signal ineffective from the fifth cycle. In FIG. 12, this interruption is indicated by a broken line. In this case, the input condition of the item number 9 in FIG. 13 is satisfied in and after the fifth cycle and the OP2SEL, OP3SEL and OP1SEL in FIG. 12 become "0". The output of the delay flip flop 110 also becomes "0" in and after the sixth cycle. Similarly to the case of the completion of instruction, the contents of the six registers including the OP2ARD 30a are also written in the general registers 13 in the sixth cycle at the time of interruption due to the interruption. The contents of the registers at this time are $108_{16}$, $130_{16}$, $218_{16}$, 1, 2, and 3, respectively. Therefore, if those contents are designated again as the input of the sort instruction, the execution of the sort instruction can be correctly restarted.

The above description was made with respect to the merge sort instruction. In addition, the merge join instruction is also similarly executed and in this case, the item number 7 and subsequent item numbers are used in the truth table in FIG. 13. A point of difference from the sort instruction is that the selection and operation circuit 101 outputs the total eight bytes of the respective higher significant four bytes on the data lines 26a and 26b. On the other hand, the outputs of the string length register (STRNG) 105 and comparator 108 are also ignored in the discrimination controller 107.

In this embodiment, the format in that the maximum number of elements of the first operand OP1 vector is designated by the instruction has been shown. However, a purpose of this designation is to prevent the possibility that a number of elements over a prescribed number are outputted for the first operand OP1 vector and it is not essential in the present invention. Since a designation of the string length is ignored in the merge join instruction, the instruction format in which it is not designated can be also considered. In the embodiment, ten registers are assigned as the registers of the serial numbers, but it is also possible to adopt the instruction format in that they are respectively individually designated or they are classified into a plurality of groups and then they are designated.

With regard to the unprocessed element head addresses, maximum number of elements and number of processed elements of the vector of each operand, it is possible to adopt the format in that the contents in the main storage unit are designated instead of the registers.

In case of the merge join instruction, the instruction format in which the number of unprocessed elements is designated in place of the maximum number of elements and number of processed elements may be adopted.

Although the instruction specifications whereby the head addresses of the unprocessed elements are not rewritten at the end of the merge sort instruction and merge join instruction can be also employed, only the address of the first element of each vector is designated at this time; therefore, in case of restarting the operation from the interrupted state due to the interruption, the process for increasing the address registers of each operand in accordance with the number of processed elements is needed as preparation to restart the interrupted instruction.

According to the embodiment shown in the drawings, it is possible to realize the vector processor which can execute the process for every loop of the extended vector operations shown in FIG. 4 by the pipeline of the one-cycle pitch. Even if each operation and discrimination in the PAD in FIG. 4 is executed in one cycle by an ordinary instruction, at least five cycles are necessary for execution of a single loop; consequently, the operating speed can be made faster by five or more times in the embodiment. This is because the operation, discrimination and updating of the index are processed in parallel due to the vector processes and the pipeline process of one-cycle pitch can be performed.

According to the invention, although the respective vectors shown in FIG. 4 are sequentially read out and stored, the extended vector operation in which the index of each vector is increased in accordance with the result of each operation is also subjected to the vector process, so that the high operating speed is realized. Namely, this is because the parallel processings of the operation, discrimination and updating of index and the like shown in FIG. 4 can be easily performed due to the vector processes. Thus, the use of the pipeline technology enables the operating speed to be made faster by five or more times.

On the one hand, in the merge sort instruction, the number of input elements may be set to an arbitrary value within a permissible range of the capacity of the main storage unit. Also, the vectors in the main storage unit can be directly designated as the operands of the sort instruction.

The present invention makes it possible to apply the vector operations in which the pipeline operations are possible even to the merge operations in which the vector operations could be hardly applied conventionally.

We claim:

1. A vector processing, comprising:
  main storage means for storing vectors including plural vector elements;
  instruction means connected to said main storage means and responsive to an instruction requiring execution of an operation on a vector for generating first to third addresses, the first address being an address of one of the vector elements of a first vector held by said mainsstorage means, the second address being an address of one of the vector elements of a second vector held thereby and the third address being an address of one of the vector elements of a third vector to be held thereby;
  operation means for performing an operation on respective input pairs of vector elements supplied thereto;
  first operand control means connected to said main storage means and said instruction means and responsive to the generated first address for sequentially supplying vector elements of the first vector from said main storage means to said operation means, each as one vector element of an input pair of vector elements supplied to said operation means, starting from the one vector element having said first address, and in such a manner that a vector element next in element number or the same vector element as currently supplied to said operation means is supplied next, depending upon whether or not a first increment signal is supplied to said first operand control means;
  second operand control means connected to said main storage means and said instruction means and responsive to the generated second address for sequentially supplying vector elements of the second vector from said main storage to said operation means, each as the other vector element of the input pair of vector elements supplied to said oeration means, starting from the one vector element having said second address, and in such a manner that a vector element next in element number or the same vector element as currently supplied to said operation is supplied next, depending upon whether or not a second increment signal is applied to said second operand control means;
  third operand control means connected to said main storage means and said instruction means and responsive to the generated third address for sequentially writing sequential outputs of said operation means into said main storage means as vector elements of a third vector, starting from the one vector element having the third address and in such a manner that an output of said operation means is written as a vector element next in element number in response to receipt of a third increment signal;
  compare means connected to receive a pair of vector elements supplied to said oeration means from said first and second operand control means for comparing at least a part of one vector element of the pair with at least a part of the other vector element of the pair; and
  operation control means connected to said compare means and said first to third operand control means for selectively supplying said first to third increment signals respectively to said first to third operand control means depending upon a comparison result by said compare means.

2. A vector processor according to claim 1, wherein the operation required by an instruction is a merge-sort operation;

wherein each vector element of each of the first and second vectors comprises first and second parts;

wherein said compare means includes means for comparing first parts of respective vector elements of a pair applied thereto;

wherein said operation control means includes means responsive to the comparison result by said compare means for controlling said operation means so that one vector element having a first part with a predetermined relative magnitude among the pair of vector elements applied thereto is selected as the result of the operation thereby and for selectively generating one of the first and second increment signals depending upon to which of the first and second vectors the vector element having the first part of the predetermined relative magnitude belongs and for providing the third increment signal to said third operand control means in synchronism with the supply of the one of the first and second increment signals.

3. A vector processor according to claim 2, further comprising:

first operand count means connected to said operation control means and responsive to the first increment signals generated thereby and to an applied maximum number of elements of the first vector for detecting whether or not a last vector element of the first vector corresponding to the maximum number is already provided to said operation means; and second operand count means connected to said operation control means and responsive to an applied maximum number of elements of the second vector for detecting whether or not a last vector element of the second vector corresponding to the maximum number is already provided to said operation means;

wherein said instruction means further includes means responsive to the instruction for providing said first and second operand count means with the maximum number of elements of the first vector and the maximum number of elements of the second vector, respectively;

wherein said operation control means further includes means connected to said compare means and said first and second operand count means and responsive to the detection of the last vector element of one of the first and second vectors and to the comparison result by said compare means indicating that the first part of the last vector element of one of the first and second vectors has the predetermined relative magnitude with respect to the first part of a vector element of the other of the first and second vectors applied to said compare means together with the last vector element of the one vector for repeatedly generating one of the first and second increment signals corresponding to the one of the first and second vectors and the third increment signals until the last vector element of the other of the first and second vectors is detected, for controlling said operation means so that vector elements belonging to the other of the first and second vectors are selected as results of the operation.

4. A vector processor according to claim 3, further comprising:

string register means for holding a length value of a string which is a unit length for dividing the first or second vectors into subgroups; and string means connected to said first and second operand count means for detecting whether or not string numbers of a pair of vector elements supplied to said operation means are the same;

wherein said operation control means further includes means responsive to a comparison result by said string means indicating that a vector element belonging to one of the first and second vectors among the pair is smaller than a vector element belonging to the other of the first and second vectors for generating one of the first and second increment signal corresponding to the one of the first and second vectors, irrespective of the comparison result by said compare means.

5. A vector processor according to claim 1, wherein the operation required by an instruction is a merge-join operation;

wherein each vector element of each of the first and second vectors comprises first and second parts;

wherein said compare means includes means for comparing first parts of vector elements of a pair applied thereto;

wherein said operation control means includes means responsive to the comparison result by said compare means indicative of coincidence of the first parts for controlling said operation means so that an output comprised of second parts of vector elements of the pair applied to said operation means is provided as the result of the operation thereby and generating said first to third increment signals and responsive to a comparison result by said compare means indictive of non-coincidence of the first parts for selectively generating one of the first and second increment signals depending upon to which one of the first and second vectors a vector element having a first part of predetermined relative magnitude belongs among the pair applied to said compare means, without generating the third increment signal.

6. A vector processor according to claim 5, further comprising first operand count means connected to said operation control means and responsive to the first increment signals generated thereby and to an applied maximum number of elements of the first vector for detecting whether or not a last vector element of the first vector corresponding to the maximum number is already provided to said operation means; and second operand count means connected to said operation control means and responsive to an applied maximum number of elements of the second vector for detecting whether or not a last vector element of the second vector corresponding to the maximum number is already provided to said operation means;

wherein said instruction means further includes means responsive to the instruction for providing said first and second operand count means with the maximum number of elements of the first vector and the maximum number of elements of the second vector, respectively;

wherein said operation control means further includes means connected to said compare means and said first and second operand count means and responsive to the detection of the last vector element of one of the first and second vectors and to a comparison result by said compare means indicating that the first part of the last vector element of the one of the first and second vectors has said predetermind relative magnitude with respect to the first part of a vector element of the other of the first and second vectors applied to said compare means together with the last vector element of the one vector for terminating supply of the first to third increment signals.

7. A vector processor according to claim 1, wherein said operation means includes means for selectively performing one of a plurality of operations; and
   wherein said operation control means includes means for controlling said operation means depending upon combination of the comparison result provided by said compare means and a signal provided by said instruction means indicative of an operation designated by the instruction and for controlling selective generation of the first to third increment signals depending upon said combination.

8. A vector processor according to claim 1, wherein said instruction means includes:
   a plurality of registers each capable of being designated by instructions; and
   decode means responsive to the instruction requiring execution of an operation on vectors for selectively reading first to third registers of said plurality of registers designated by the instruction so as to provide the contents of said first to third registers as the first to third addresses, respectively.

9. A vector processor according to claim 8, further comprising scalar operation means connected to said plurality of registers and responsive to a scalar instruction for performing a scalar operation on the content of one of said plurality of registers so as to write the result of the scalar operation into another one of said plurality of registers, so as to enable the result of the scalar operation to be used as one of the first to third addresses.

10. A vector processor according to claim 1, further comprising:
    first operand count means connected to said operation control means and responsive to the first increment signals generated thereby and to an applied maximum number of elements of the first vector for detecting whether or not a last vector element of the first vector corresponding to the maximum number is already provided to said operation means; and
    second operand count means connected to said operation control means and responsive to an applied maximum number of elements of the second vector for detecting whether or not a laat vector element of the second vector corresponding to the maximum number is already provided to said operation means;
    wherein said instruction means further includes means responsive to the instruction for providing said first and second operand count means with the maximum number of elements of the first vector and the maximum number of elements of the second vector, respectively; and
    wherein said operation control means includes means responsive to the detection of the last vector element of either the first vector or the second vector for controlling further selective supply of the first and second increment signals depending upon a comparison result by said compare means and upon which one of the last vector element of the first vector and the last vector element of the second vector is detected.

11. A vector processor according to claim 10, wherein said operation means includes means for selectively performing one of a plurality of operations;
    wherein said operation control means includes means for controlling said operation means depending upon a combinatuion of a comparison result provided by said compare means, a signal provided by said instruction means indicative of an operation designated by the instruction and detection of the last vector element of one of the first and second vectors and for controlling selective generation of the first to third increment signals depending upon said combination.

12. A vector processor according to claim 10, wherein said instruction means further includes means responsive to the instruction for providing said first and second operand count means with first and second processed numbers of elements, respectively, the first processed number of elements indicating a total number of vector elements belonging to the first vector and having small numbers of element than the one vector element of the first vector located at the first address, the second processed number of elements indicating a total number of vector elements belonging to the second vector and having smaller numbers of element than the one vector element of the second vector located at the second address; and
    wherein said first and second operand count means each includes:
    counter means connected to said instruction means and said operation control means for counting up the first or second processed number of elements in response to the first or second increment signal; and
    compare means for comparing the value counted by said counter means with the maximum number of elements of the first or second vector.

13. A vector processor according to claim 12, further comprising:
    third operand count means connected to said operation control means and responsive to the third increment signal generated thereby and to an applied maximum number of elements of the third vector for detecting whether or not a last vector element of the third vector corresponding to the maximum number is provided to said operation means;
    wherein said instruction means further includes means responsive to the instruction for providing said third operand count means with the maximum number of elements of the third vector;
    wherein said operation control means further includes means responsive to the detection of the last vector element by said third operand count means for terminating further supply of the first to third increment signals.

14. A vector processor according to claim 1, further comprising:
    first count means connected to said operation control means and responsive to the first increment signals generated thereby and to an applied maximum number of elements of the first vector for detecting whether or not a last vector element of the first vector corresponding to the maximum number is already provided to said operation means; and second operand count means connected to said operation control means and responsive to an applied maximum number of elements of the second vector for detecting whether or not a last vector element of the second vector corresponding to the maximum number is already provided to said operation means;

wherein said instruction means further includes means responsive to the instruction for providing said first and second operand count means with the maximum number of elements of the first vector and the maximum number of elements of the second vector, respectively;

third operand count means connected to said operation control means and responsive to the third increment signal generated thereby and to an applied maximum number of elements of the third vector for detecting whether or not a last vector element of the third vector corresponding to the maximum number is provided to said operation means;

string register means for holding a length value of a string which is a unit length for dividing the first or second vectors into subgroups; and string means connected to said first and second operand count means for detecting string numbers of a pair of vector elements supplied to said operation means are the same;

wherein said first to third operand count means each includes:

(1) counter means connected to said operation control means for counting up an applied first, second or third processed number of elements in response to the first, second or third increment signal;

(2) compare means connected to said counter means for comparing the value counted by said counter means with the maximum number of elements of the first, second or third vector;

wherein said instruction means further includes means responsive to the instruction for providing said first operand count means with the maximum number of elements of the first vector and the first processed number of elements, providing said second operand count means with maximum number of elements of the second vector and the second processed number of elements, providing said third operand count means with the maximum number of elements of the third vector and the third processed number of elements and providing the string register means with the string length.

15. A vector processor according to claim 14, wherein said instruction means includes:

a plurality of registers each capable of being designated by instructions; and decode means responsive to the instruction requiring execution of an operation on vectors for selectively providing contents of first to tenth registers, designated by the instruction, as the first to third addresses, the maximum numbers of elements of the first to third vectors, the first to third processed numbers of elements, and the string length.

16. A vector processor according to claim 15, further comprising:

means for detecting an interrupt generated in the vector processor;

means connected to respond to the detection of the interrupt for saving counted-up values of the first to third processed numbers of elements by said counter means within each of said first to third operand count means into said plurality of registers.

17. A vector processor, comprising:

a main storage;

vector operation means connected to said main storage for performing at least one operation of a merge-sort operation and a merge-join operation on first and second vectors held by said main storage so as to provide a third vector representing the result of the one operation to said main storage; and instruction means connected to receive an instruction from said main storage for decoding the received instruction and for generating data to be used by said vector operation means so as to control the one operation.

18. A vector processor according to claim 17, wherein said vector operation means includes means for selectively performing either the merge-sort operation or the merge-join operation.

19. A vector processor according to claim 17, further comprising:

scaler operation means connected to said main storage for performing a scalar operation on an operand held by said main storage so as to provide resultant scalar data of the scalar operation to said main storage;

wherein said instruction means further comprises:

a plurality of registers each capable of being designated by instructions;

means responsive to an instruction requiring a scalar operation for providing scalar data held by one of said plurality of registers to said scalar operation means or scalar data provided by said scalar operation means as a result of a scalar operation to one of said plurality of registers and responsive to an instruction requiring one of the merge-sort and merge-join operation for providing scalar data held by part of said plurality of registers to said vector operation means so as to control execution of the one of the merge-sort and merge-join operation.

20. A vector processor according to claim 19, further comprising:

another vector operation means connected to said main storage for performing a vector operation on vectors held by said main storage so as to provide a resultant vector thereto, in such a manner that the vecto operation is done on each pair of vector elements having a same number of element;

wherein said instruction means further includes means for controlling the other vector operation means in response to decoding of an instruction requiring the vector operation.

* * * * *